(12) United States Patent
Sarwar et al.

(10) Patent No.: US 10,791,560 B2
(45) Date of Patent: Sep. 29, 2020

(54) DISTRIBUTED AND ADAPTIVE HETEROGENEOUS WIRELESS COMMUNICATION MANAGEMENT

(71) Applicant: Intel Corporation, Santa Clara, CA (US)

(72) Inventors: Usman Sarwar, Penang (MY); Anthony L. Chun, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 15/719,371

(22) Filed: Sep. 28, 2017

(65) Prior Publication Data

US 2019/0098635 A1    Mar. 28, 2019

(51) Int. Cl.
*H04W 72/08* (2009.01)
*H04W 4/70* (2018.01)
(Continued)

(52) U.S. Cl.
CPC .......... *H04W 72/082* (2013.01); *H04W 4/70* (2018.02); *H04W 4/80* (2018.02); *H04W 84/12* (2013.01)

(58) Field of Classification Search
CPC .................. H04B 7/2121; H04B 7/2123; H04J 2203/0069; H04Q 2213/394; H04W 72/04;
(Continued)

(56) References Cited

U.S. PATENT DOCUMENTS 8,503,419 B2 * 8/2013 Savoor ............... H04L 41/5019
370/338
9,743,418 B1 * 8/2017 Jupudi ................. H04B 17/318
(Continued)

FOREIGN PATENT DOCUMENTS

CN          103517321 A  *  1/2014

OTHER PUBLICATIONS

Wail Mardini et al., "Interference Problem between ZigBee and WiFi", IPCSIT vol. 30, 2012, http://www.ipcsit.com/vol30/024-ICNCS2012-G3061.pdf, retrieved on Feb. 22, 2018, 6 pages.
(Continued)

*Primary Examiner* — Robert J Lopata
(74) *Attorney, Agent, or Firm* — Schwabe, Williamson & Wyatt, P.C.

(57) ABSTRACT

In embodiments, an apparatus for providing adaptive wireless communication management may include a wireless interference scanner to gather interference data of wireless communications of at least two wireless protocols in free space surrounding the apparatus. The apparatus may further include a communications module, coupled to the wireless interference scanner, to interact with a wireless configuration service provider to send the interference data to, and from which to receive optimal channel settings for, a wireless device to wirelessly communicate at least in part through the free space surrounding the apparatus. The apparatus may further include a channel and frequency configuration module, coupled to the communications module, to configure the wireless device, based, at least in part, on the optimal channel settings.

23 Claims, 10 Drawing Sheets

(51) Int. Cl.
*H04W 84/12* (2009.01)
*H04W 4/80* (2018.01)
(58) Field of Classification Search
CPC ... H04W 72/12; H04W 76/00; H04W 72/082; H04W 84/12; H04W 4/80
USPC .......................................................... 370/329
See application file for complete search history.

(56) References Cited

U.S. PATENT DOCUMENTS

| | | | | |
|---|---|---|---|---|
| 9,781,685 | B2* | 10/2017 | Tsui | H04W 52/243 |
| 10,390,254 | B2* | 8/2019 | Kim | H04B 17/345 |
| 2002/0136268 | A1* | 9/2002 | Gan | H04B 1/715 |
| | | | | 375/133 |
| 2005/0124347 | A1* | 6/2005 | Hosein | H04W 36/0083 |
| | | | | 455/446 |
| 2005/0223091 | A1* | 10/2005 | Zahavi | H04L 41/0631 |
| | | | | 709/224 |
| 2010/0067469 | A1* | 3/2010 | Gaal | H04W 72/082 |
| | | | | 370/329 |
| 2012/0026941 | A1* | 2/2012 | Ahmad | H04W 48/16 |
| | | | | 370/328 |
| 2013/0003590 | A1* | 1/2013 | Gage | H04W 52/244 |
| | | | | 370/252 |
| 2013/0035108 | A1* | 2/2013 | Joslyn | H04W 24/08 |
| | | | | 455/454 |
| 2013/0090142 | A1* | 4/2013 | Lee | H04B 1/0475 |
| | | | | 455/501 |
| 2013/0114515 | A1* | 5/2013 | Koo | H04J 11/0023 |
| | | | | 370/329 |
| 2013/0182690 | A1* | 7/2013 | Kovacs | H04W 72/0426 |
| | | | | 370/336 |
| 2014/0036745 | A1* | 2/2014 | Koo | H04W 16/14 |
| | | | | 370/311 |
| 2014/0044095 | A1* | 2/2014 | Li | H04W 16/14 |
| | | | | 370/331 |
| 2014/0112291 | A1* | 4/2014 | Hahn | H04W 16/10 |
| | | | | 370/329 |
| 2014/0128088 | A1* | 5/2014 | Farhadi | H04W 16/14 |
| | | | | 455/452.1 |
| 2014/0293971 | A1* | 10/2014 | Yoo | H04W 56/003 |
| | | | | 370/336 |
| 2014/0301235 | A1* | 10/2014 | Ahn | H04W 16/14 |
| | | | | 370/252 |
| 2014/0334440 | A1* | 11/2014 | Wong | H04W 36/0011 |
| | | | | 370/331 |
| 2015/0011226 | A1* | 1/2015 | De Sousa | H04W 24/02 |
| | | | | 455/446 |
| 2015/0163043 | A1* | 6/2015 | Lee | H04L 5/0073 |
| | | | | 370/336 |
| 2015/0208253 | A1* | 7/2015 | Kim | H04W 24/02 |
| | | | | 370/252 |
| 2015/0264594 | A1* | 9/2015 | Davydov | H04W 72/12 |
| | | | | 370/252 |
| 2015/0319633 | A1* | 11/2015 | Ji | H04B 7/0452 |
| | | | | 370/252 |
| 2016/0029404 | A1* | 1/2016 | Aryafar | H04W 72/1231 |
| | | | | 370/277 |
| 2016/0050676 | A1* | 2/2016 | Sinnaduray | H04W 72/082 |
| | | | | 370/329 |
| 2016/0050677 | A1* | 2/2016 | Cheng | H04W 56/00 |
| | | | | 370/329 |
| 2016/0183282 | A1* | 6/2016 | Balaban | H04W 4/021 |
| | | | | 370/329 |
| 2016/0295538 | A1* | 10/2016 | Sun | H04W 56/0045 |
| 2016/0309476 | A1* | 10/2016 | Madan | H04W 72/0453 |
| 2017/0164375 | A1* | 6/2017 | Sundararajan | H04W 72/1231 |
| 2018/0048383 | A1* | 2/2018 | Syed | H04B 7/212 |
| 2018/0063851 | A1* | 3/2018 | Abraham | H04W 16/14 |
| 2018/0234985 | A1* | 8/2018 | Filoche | H04B 17/345 |
| 2018/0295637 | A1* | 10/2018 | Manolakos | H04W 72/1226 |
| 2019/0028193 | A1* | 1/2019 | Miras | H04B 10/1149 |
| 2019/0037418 | A1* | 1/2019 | Gunasekara | H04W 24/02 |
| 2019/0140789 | A1* | 5/2019 | Tang | H04W 72/0446 |
| 2019/0260485 | A1* | 8/2019 | Byun | H04B 17/336 |

OTHER PUBLICATIONS

Chieh-Jan Mike Liang, et al., "Surviving Wi-Fi Interference in Low Power ZigBee Networks", SenSys'10, Nov. 3-5, 2010, Zurich, Switzerland, http://research.microsoft.com/pubs/138258/sensys10-final172.pdf, retrieved on Feb. 22, 2018, 14 pages.
"WiFi channel scanners or WIFI network analyzer", http://wifichannelscanner.com/, retrieved on Feb. 22, 2018, 2 pages.
"How to Find the Best WiFi Channel for Your WiFi Network", https://www.maketecheasier.com/find-best-wifi-channel/, retrieved on Feb. 22, 2018, 8 pages.
"Wifi Analyzer", https://play.google.com/store/apps/details?id=cz.webprovider.wifianalyzer, retrieved on Feb. 22, 2018, 2 pages.
"Bluetooth scanner", https://play.google.com/store/apps/details?id=com.SooHau.bluetoothrssiscanner, retrieved on Feb. 22, 2018, 2 pages.
Avoiding RF Interference between WiFi and ZigBee:, http://www.mobiusconsulting.com/papers/ZigBeeandWiFiInterference.pdf, retrieved on Feb. 22, 2018, 5 pages.
"Avoiding Interference in the 2.4 GHz ISM band", http://www.eetimes.com/document.asp?doc_id=1273359&page_number=2, retrieved on Feb. 22, 2018, 4 pages.
'WiFi and Bluetooth coexistence', http://www.ecnmag.com/article/2012/03/wi-fi-and-bluetooth-coexistence, retrieved on Feb. 22, 2018, 7 pages.
"Wireless LAN controller", https://en.wikipedia.org/wiki/Wireless_LAN_controller, retrieved on Feb. 22, 2018, 1 page.

* cited by examiner

DISTRIBUTED AND ADAPTIVE HETEROGENEOUS WIRELESS COMMUNICATION MANAGEMENT

FIELD

Embodiments of the present disclosure relate to wireless communications, and in particular to providing adaptive wireless communications management in a heterogeneous wireless communication environment.

BACKGROUND

It is noted that heterogeneous wireless technologies operating in a similar frequency range may encounter interference from one another, even though they may be deployed for different purposes. For example, in the Internet of Things (JOT) domain, different types of communication technologies may be simultaneously deployed in various use cases. For example, there may be a smart building environment where WiFi, Bluetooth and IEEE 802.15.4/ZigBee are simultaneously in use by various WiFi, Bluetooth and IEEE 802.15.4/ZigBee devices, all operating in the 2.4 GHz band. Or, for example, WiFi and Bluetooth, each operating in the 2.4 GHz band, may be concurrently used in software defined automobile cockpits. Such heterogeneous wireless interference may cause degradation of network performance, and may also cause the wireless devices to retransmit, thus reducing throughput and causing a poor user experience.

DETAILED DESCRIPTION

Figure 1:
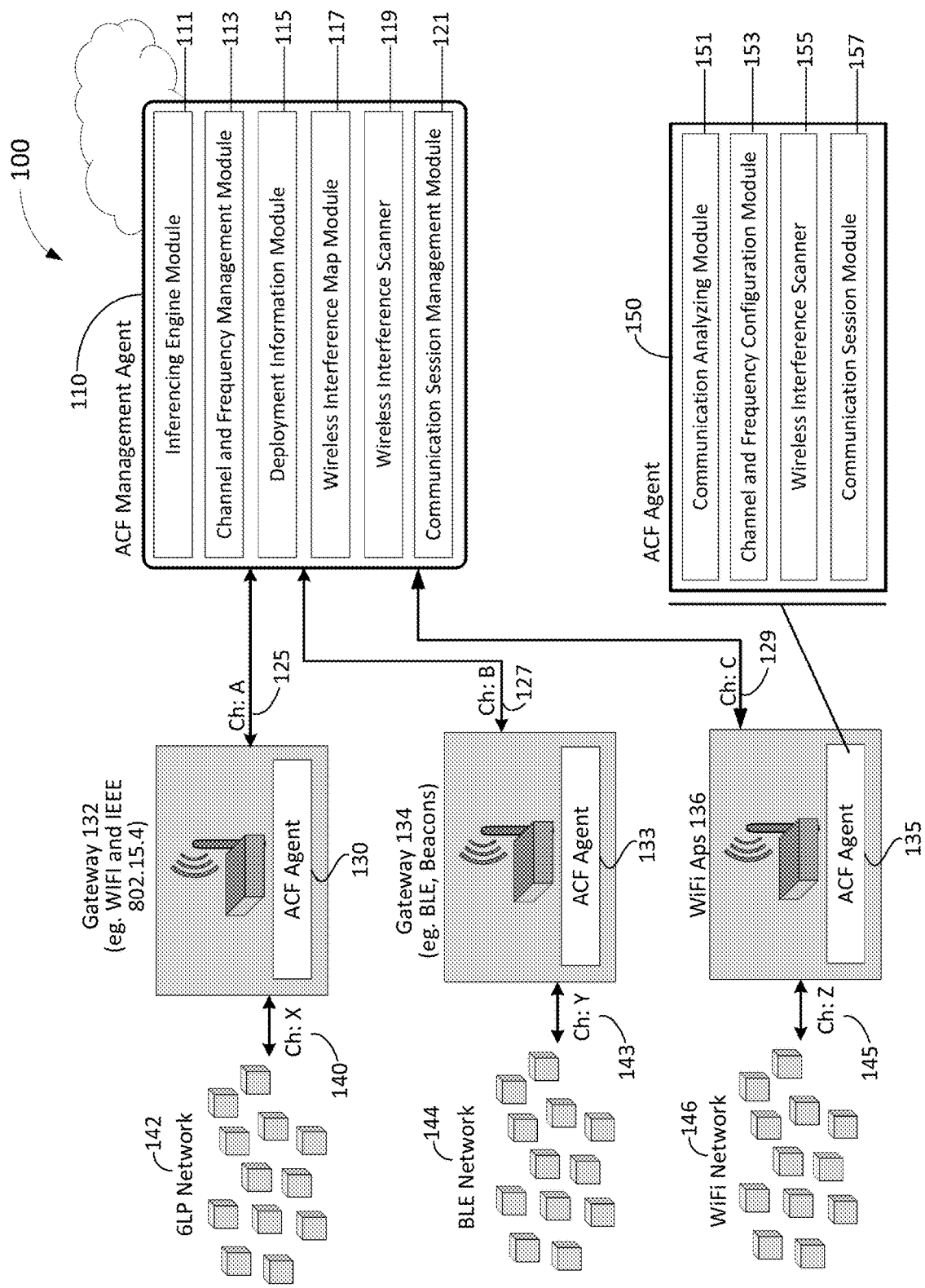
FIG. 1 illustrates an adaptive channel and frequency management service system according to various embodiments.

In embodiments, an apparatus for providing adaptive wireless communication management may include a wireless interference scanner to gather interference data of wireless communications of at least two wireless protocols in free space surrounding the apparatus. The apparatus may further include a communications module, coupled to the wireless interference scanner, to interact with a wireless configuration service provider to send the interference data to, and from which to receive optimal channel settings for, a wireless device to wirelessly communicate at least in part through the free space surrounding the apparatus. The apparatus may further include a channel and frequency configuration module, coupled to the communications module, to configure the wireless device, based, at least in part, on the optimal channel settings.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" as used herein may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/ or any other like term denoting a pathway or medium through which data is communicated.

As used hereinafter, including the claims, the terms "module", "communication analyzing module", "channel and frequency configuration module", "communication session module", "inference engine module", "channel and frequency management module", "deployment information module", "wireless interference map module" and "communication session management module", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

As used hereinafter, including the claims, the terms "wireless interference scanner" may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

Currently, attempts to address wireless interference focus primarily on homogenous connectivity technologies. For example, in WiFi domains, some wireless LAN controllers provide a user with the option to manually optimally change and manage WiFi channels. However, there is no tool or service exists that autonomously manages optimization of channels in a heterogeneous wireless communication environment.

Another conventional approach involves providing interference mitigation via a dedicated controller that is hard-wired between different radios that coordinates when one radio can be used versus another. While this approach may have value in a combination Wi-Fi/Bluetooth wireless device, it is not useful where multiple Wi-Fi, Bluetooth or ZigBee radios are deployed in close proximity. For example, as where numerous Wi-Fi hot spots and Bluetooth radios in automobiles are in close proximity due to freeway traffic so that wireless transmissions from the plurality of automobiles interfere with each other. To actually mitigate this type of interference, an autonomous and distributed interference mitigation scheme is required.

Thus, there is no known solution providing an adaptive and dynamic frequency management system which can handle homogeneous interference in real world contexts, where such homogeneous interference may come from different IoT devices or gateways, and may include two or more wireless protocols, by taking into account heterogeneous wireless connectivity that mutually interferes in the same frequency band(s). It is further noted that a complicating factor of this problem is the existence of different standards and specifications used for handling different wireless communication technologies. This is one of the issues that must be dealt with for effective deployment of IoT solutions going forward.

In embodiments, an adaptive approach to autonomously manage and configure one or more wireless devices disposed in heterogeneous interference environments so as to (best) avoid interference may be implemented. The approach may include measuring Radio-frequency (RF) parameters, analyzing different devices' RF parameters according to their deployed infrastructure, and autonomously configuring them.

Thus, in embodiments, an intelligent approach may be implemented which adaptively configures and manages frequency and channel assignments for wireless devices disposed in heterogeneous interference environments. In embodiments, such wireless devices may include, for example, an IoT gateway, an IoT edge node, a device made up of multiple nodes acting as a networked virtual "device", or a WiFi Access Point ("AP"), and these and more wireless devices may all be disposed in the same space, or in close enough proximity to interfere with each other, besides any other wireless communications that be occurring in the space or proximate area. In embodiments, frequency and channel assignments may include, for example, a suitable channel for a WiFi AP or a scan channel mask for a ZigBee coordinator.

In embodiments, wireless interference of deployed wireless devices, such as, for example, WiFi, BT/BLE, 802.15.4 in 2.4 GHz, may be mitigated by scanning the radio environment, and dynamically changing channels of the wireless devices for optimal configurations in the wireless infrastructure. In embodiments, an apparatus according to various embodiments may use high level Application Programming Interfaces (APIs) for autonomous configuration without the need of hardware or firmware upgrades. Implementations according to various embodiments may be distributed and may thus easily scale to larger numbers of wireless devices. Further, in embodiments, QoS metrics may be used to prioritize access to channels. Thus, for example, high priority messages may be allocated channel access over lower priority messages. In embodiments, a wireless device communicates using at least one wireless protocol, but may, in embodiments, communicate using multiple wireless protocols. In embodiments, a wireless device may be disposed in a space or proximate area where there are wireless communications of multiple wireless protocols. Such a space may be known as a "heterogeneous interference environment."

FIG. 1 depicts an example adaptive channel and frequency (ACF) management service system 100 according to various embodiments. With reference thereto, system 100 may include an ACF Management Agent 110 and an ACF Agent 150. For example, as shown in FIG. 1, ACF Agent 150 may be provided in or near a wireless device, such as a wireless gateway, the wireless device itself provided in a premise or in a vehicle, and ACF Management Agent 110 may be provided in one or more servers in the cloud. Alternatively, ACF Management Agent 110 may be collocated with ACF Agent 150, or disposed nearby, and may be hard-wired or otherwise communicatively connected to it, such as, for example, where numerous ACF Agents 150 are provided in one premise, or in close proximity, such as in an apartment building, and where each ACF Agent 150 is hard-wired, or otherwise communicatively connected, to a central ACF Management Agent 110 serving the entire building. In the example system 100 of FIG. 1, ACF Management Agent 110 may be provided in the cloud and ACF Agent 150 may be provided in a wireless device that supports multiple wireless communication protocols.

Continuing with reference to FIG. 1, ACF Management Agent 110 may, for example, be communicatively connected to multiple ACF Agents 130, 133 and 135, over channels A 125, B 127 and C 129, respectively. In the example of FIG. 1, an ACF Agent may be provided in a wireless gateway. For example, ACF Agent 130 may be provided in WiFi and IEEE 802.15.4 Gateway 132 which accesses 6LP Network 142 over channel X 140, and ACF Agent 133 may be provided in BLE and Beacons Gateway 134 which accesses BLE Network 144 over channel Y 143. Alternatively, for example, an ACF Agent 150 may be provided in another wireless device, such as ACF Agent 135 provided in WiFi Access Points (APs) 136 which is communicatively connected to WiFi Network 146 over channel Z 145. As noted above, implementations according to various embodiments may be distributed and may thus easily scale to larger numbers of wireless devices.

It is further noted that in alternate embodiments to those illustrated in FIG. 1 (where the ACF Agent is provided within a gateway), an ACF Agent may be disposed nearby, or in close proximity with, and be communicatively coupled to, a wireless device, but not physically collocated with the wireless device.

As shown, in embodiments, an ACF Agent may be provided in a heterogeneous interference environment, such as shown in FIG. 1, where there are multiple gateways (as well as other wireless communications devices) in the space, where each gateway has at least one, but perhaps more, wireless protocols. It is noted that a wireless device communicating in a space, in general, may comprise a single gateway, for example, communicating on one or more wireless protocols, or, for example, it may comprise multiple nodes acting as a networked virtual "device", that together communicate on one or more wireless protocols within the space or proximate area. Thus, in embodiments, each ACF Agent is faced with several sources of wireless interference, which may impact the ability of its associated gateway, or other associated wireless device, to effectively communicate using its specific wireless protocol(s).

Continuing with reference to FIG. 1, ACF Management Agent 110 may include several modules. These are next described (from the bottom up with reference to FIG. 1). As noted, in embodiments, ACF Management Agent 110 may manage several gateways in a distributed approach, using interference information regarding local neighboring nodes as well as network traffic QoS data for optimal wireless connectivity. As noted, the gateways may be disposed in the same space, and may each potentially interfere with the others. ACF Management Agent 110 may include Communication Session Management Module 121, which may manage communications between ACF Agent 150 and ACF Management Agent 110 to provide synchronous and asynchronous session management and tracking services. In embodiments, Communication Session Management Module 121 may provide a mechanism for ACF Agents and an ACF Management Agent to exchange information and update status for management purposes.

ACF Management Agent 110 may further include Wireless Interference Scanner 119. In embodiments, this module may make use of one or more wireless connectors/coordinators and, may gather local wireless interference information to be shared with Wireless Interference Map Module 117 for generating a wireless interference map. For clarity, a wireless connector/coordinator controls network access for a specific wireless technology.

In embodiments, Wireless Interference Scanner 119 may receive data from specific wireless connector/coordinators that perform the actual radio measurements or may obtain the radio measurements via one or more ACF Agents. In embodiments, ACF Management Agent 110 may further include Wireless Interference Map Module 117. In embodiments, this module may construct a wireless interference map using location information and interference status obtained from information exchanged between an ACF Agent running on an edge device (e.g., a gateway or AP) and Wireless Interference Scanner 119 of ACF Management Agent 110.

Continuing with reference to FIG. 1, ACF Management Agent 110 may also include Deployment Information Module 115. In embodiments, this module may gather local deployment information (e.g., network performance, network density, etc.) from an ACF Agent running on an edge device. In embodiments, local deployment information collected from all ACF Agents may be processed and fed into Inferencing Engine Module 111 for better inferencing on the wireless configuration settings. In embodiments, the local deployment information may also contain data on neighboring ACF Agents for device to device interference understanding. In embodiments, this data on neighboring ACF Agents may be obtained by ACF Agents nearby one another relaying data to each other via an ACF Management Agent. It is here noted that in a heterogeneous interference environment there may be a plurality or wireless devices, all communicating using different wireless protocols. Some or all of those wireless devices may be associated with an ACF Agent, as shown in FIG. 1, and some of those wireless devices may not be. In the case where some or all of those wireless devices are associated with an ACF Agent, those devices may relay data to one another via a common ACF Management Agent.

Still continuing with reference to FIG. 1, ACF Management Agent 110 may also include Channel and Frequency Management Module 113, which may contain information on frequency band and channel mapping/allocation information from all supported wireless technologies. Channel and Frequency Management Module 113 may also contain rules regarding frequency or channel configurations, such as, for example, WiFi frequency channel, ZigBee channel mask, etc. In embodiments, this module may provide particular wireless technologies information to Inferencing Engine Module 111 so that inferencing results may be processed into appropriate configuration settings based on the configuration rules of a given wireless technology. In embodiments, Channel and Frequency Management Module 113 may add support for new wireless technologies as they may develop.

Finally, ACF Management Agent 110 may include Inferencing Engine Module 111. In embodiments, Inferencing Engine Module 111 may infer optimal configuration settings for each wireless device associated with an ACF Agent 150, such as Gateways 132 or 134, or WiFi Access Points 136, for example, based on an interference map constructed by Wireless Interference Map Module 117. As noted, in embodiments, the interference map may be informed by Deployment Information Module 115, and frequency band or supported channels information for the particular wireless technologies may be pulled from Channel and Frequency Management Module 113. In embodiments, Inferencing Engine Module 111 may use all of these parameters to construct an optimal RF landscape for deployment of IoT devices.

Next described are details of ACF Agent 150, with continued reference to FIG. 1. As noted above, ACF Agent 150 may gather deployment information and also interact with a associated local wireless device (e.g., gateway) to achieve optimal wireless connectivity configurations based on information exchanged with ACF Management Agent 110. In embodiments, ACF Agent 150 may include Communication Session Module 157, Wireless Interference Scanner 155, Channel and Frequency Configuration Module 153, and Communication Analyzing Module 151. These are next described in detail.

In embodiments, Communication Session Module 157 may maintain communication sessions with ACF Management Agent 110, which, in embodiments, may be cloud based. Communication Session Module 157 may synchronize with the service provider, through ACF Management Agent 110, to update status of an associated wireless device, and to exchange information collected from other modules on the wireless device with ACF Management Agent. In embodiments, Wireless Interference Scanner 155 may utilize a wireless connector/coordinator and may reside on, or be disposed near, a wireless device associated with ACF Agent 150 (e.g., Gateways 132, 134 and WiFi APs 136 in FIG. 1) to gather local wireless interference information in the free space surrounding ACF agent 150. As noted above, a wireless connector/coordinator measures local interference and controls network access for a specific wireless technology.

In embodiments, Channel and Frequency Configuration Module 153 may interact with wireless connectivity management middleware and drivers on a wireless device to configure a wireless connector/coordinator on the wireless device based on optimal settings as may be recommended by ACF Management Agent 110. Thus, in embodiments, Channel and Frequency Configuration Module 153 may continue to configure the associated wireless device over time based on information received on an ongoing basis from ACF Management Agent 110. Supporting this feature, in embodiments, a given ACF Agent 150 may subscribe to continuous updates, or may subscribe to only a setup configuration during deployment, from an ACF management service provider.

Finally, ACF Agent 150 may include Communication Analyzing Module 151. In embodiments, this module may monitor the overall performance of wireless communications of the associated wireless device, and may perform local analysis based on network QoS metrics derived from statistics collected by the wireless connectivity drivers.

Before further describing the adaptive heterogeneous wireless communication management of the present disclosure, it should be noted that while for ease of understanding FIG. 1 illustrates each of 6LP Network 142, BLE Network 144 and WiFi Network as having its own plurality of devices, in embodiments, a wireless device in support of multiple communication protocols may be a member of more than one of the networks 142-146 at the same time, and may be a member of other wireless networks (not shown) as well.

Figure 2:
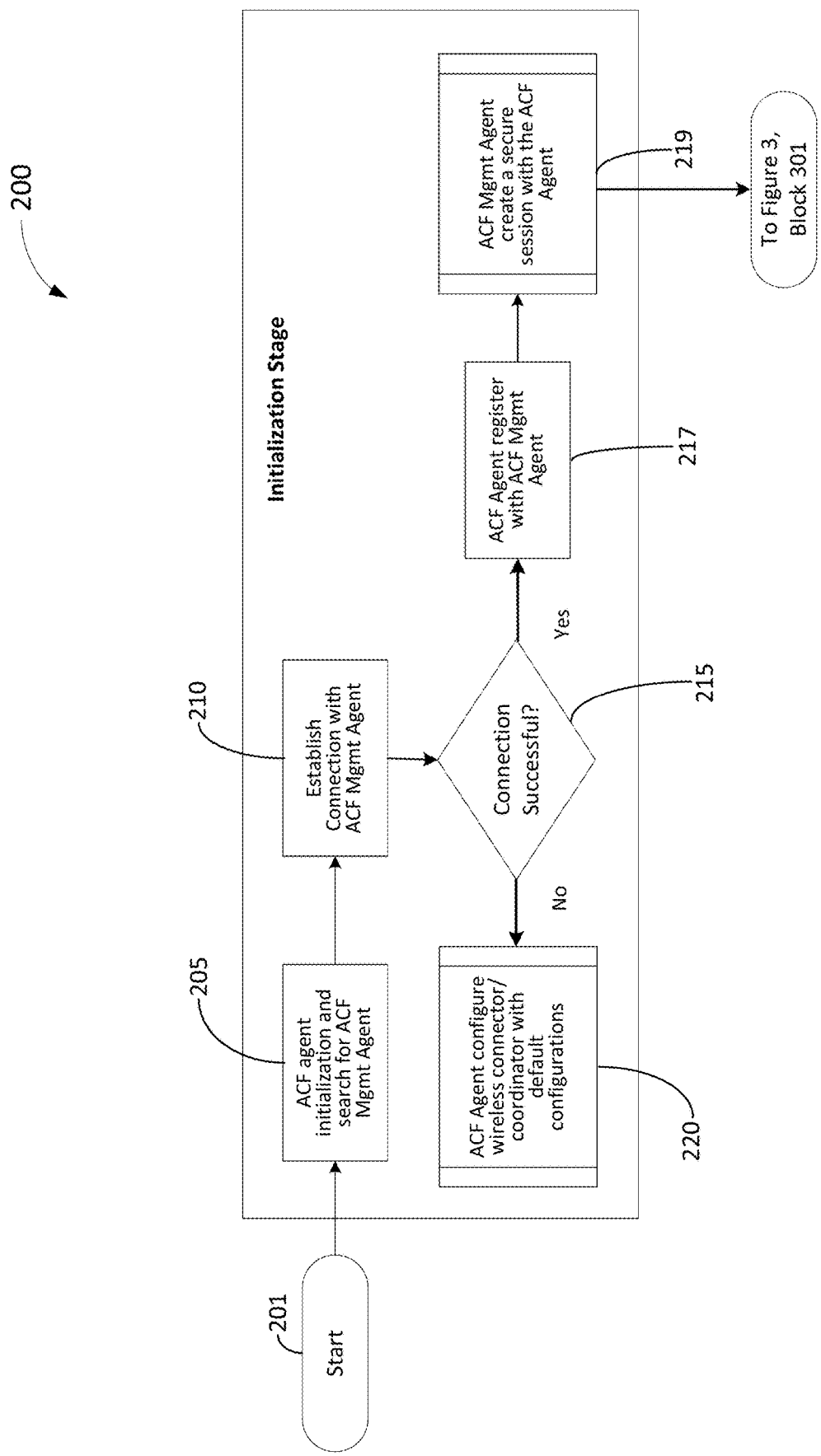
FIG. 2 illustrates an overview of the operational flow of a process for an initialization stage of an adaptive channel and frequency agent, in accordance with various embodiments.
Figure 3:
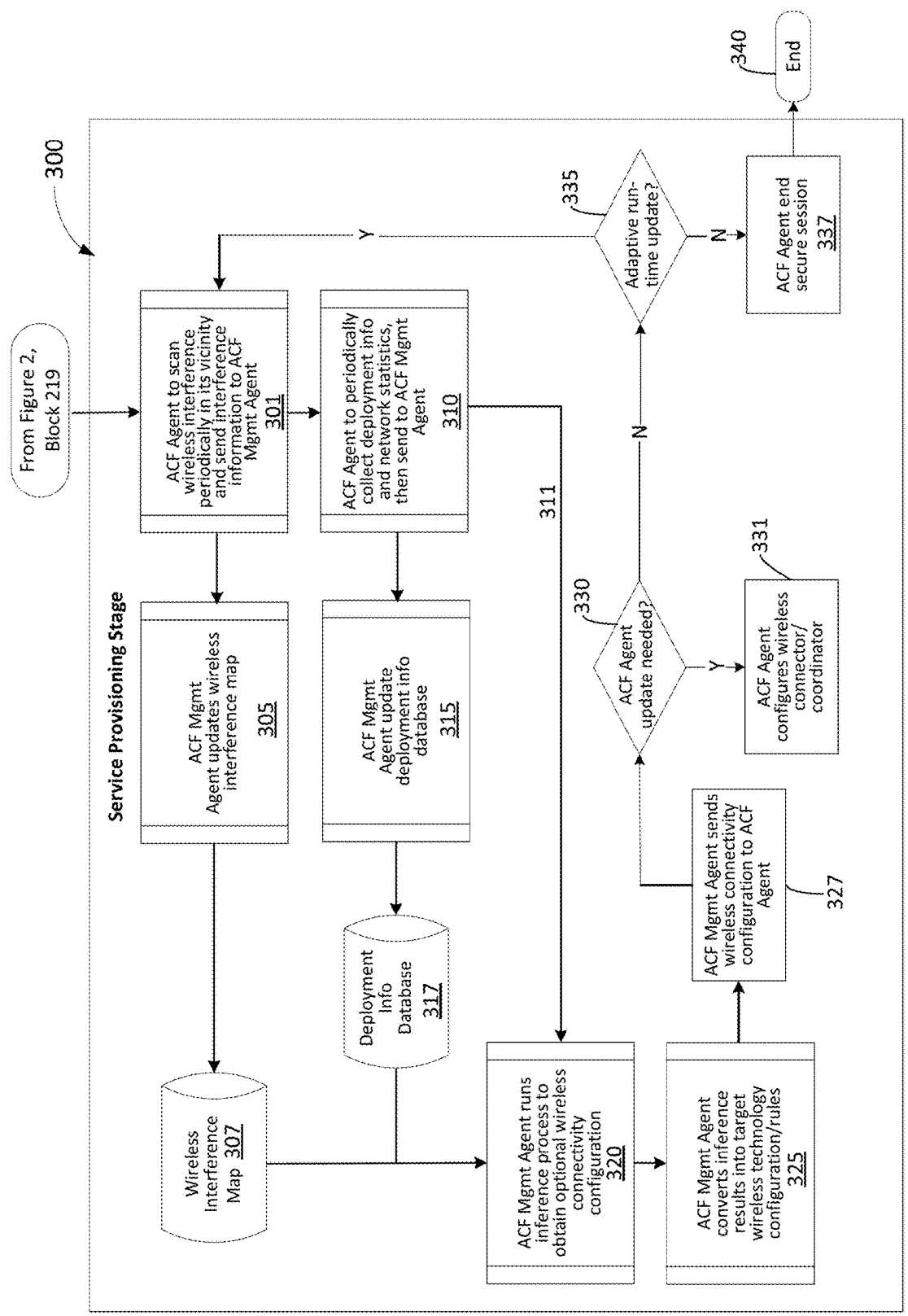
FIG. 3 illustrates an overview of the operational flow of a process for a service provisioning stage of an adaptive channel and frequency management agent, in accordance with various embodiments.

FIGS. 2 and 3 together illustrate an overall process of a distributed adaptive frequency and channel management system according to various embodiments. Such a system may be, in embodiments, system 100 of FIG. 1. It is noted that FIGS. 2 and 3 present a simplified diagram of process flow, and it should be understood that, in embodiments, a management service agent may manage multiple sessions concurrently and that also the sequence of gathering and sending data may be changed from that shown in FIG. 3, or may run in parallel. It is noted that FIGS. 2 and 3 illustrate communications between one ACF Agent and one ACF Management Agent, for simplicity. As noted above, an ACF Management Agent may, and likely will, service multiple ACF Agents, and some of the ACF Agents it services may be disposed in the same space, and interfere with each other. Thus, in embodiments, the interactions illustrated in FIGS.

2 and 3 may occur in parallel, and often simultaneously, between several ACF Agents and an ACF Management Agent.

With reference to FIG. 2, an overview of the operational flow of a process 200 for an initialization stage of an adaptive channel and frequency agent, e.g., ACF Agent 150 of FIG. 1, in accordance with various embodiments, is presented.

Process 200 begins at block 201, and proceeds to block 205, where the ACF Agent may perform an initialization, and may search for an ACF Management Agent to connect to. From block 205 process 200 may proceed to block 210, where, if an ACF Management Agent was found, the ACF Agent may attempt to establish a connection with it. From block 210, process 200 may proceed to query block 215, where it may be determined if the connection to the ACF Management Agent was successful.

If No, then process 200 may proceed to block 220, where the ACF agent may configure a wireless connector/coordinator of an associated wireless device using only default configurations. In embodiments, default configurations may include factory settings, or may be previously sent from an ACF Management Agent based on overall global learning. On the other hand, if Yes at block 215, then process 200 may proceed to block 217, where the ACF Agent may register with an ACF management agent, e.g., ACF Management Agent 110 of FIG. 1. From block 217, process 200 may proceed to block 219, where a secure session between the ACF Agent and the ACF Management Agent may be created. This secure communications session allows for the exchange of interference and deployment information, as well as optimal wireless configuration data, to be exchanged, as illustrated in FIG. 3, next described.

With reference to FIG. 3, an overview of the operational flow of a process 300 for a service provisioning stage of an adaptive channel and frequency management agent, e.g., ACF Management Agent 110 of FIG. 1, in accordance with various embodiments, is presented. The term "service provisioning stage" refers to actions taken by an ACF Management Agent following data acquisition by an ACF Agent. Process 300 thus initially includes actions taken on an ACF Agent, which result in data being sent to the ACF Management Agent, where it is processed. Upon the ACF Management Agent completing the data processing and generating a wireless connectivity configuration, the wireless connectivity configuration is then passed to the ACF Agent, which takes certain actions as a result. Thus, in process 300 blocks 301 and 310, refer to initial processing or actions taken on an ACF Agent, and following passing of data from the ACF Agent, blocks 305, 307, 315, 317, 320, 325 and 327 refer to processing or actions taken on the ACF Management Agent. Finally, after passing of data from the ACF Management Agent to the ACF Agent at block 327, blocks 330, 331, 335 and 337 refer to processing or actions taken on the ACF Agent.

Process 300 begins at block 301, which follows the situation shown in block 219 of FIG. 2, described above, where a secure connection between ACF Agent and ACF Management Agent has been established. At block 301, an ACF Agent may periodically scan wireless interference in its vicinity, i.e., in the free space surrounding the ACF agent, and send the interference information to an ACF Management Agent. It is noted that "periodically" in this context may refer to a pre-defined time interval, or, for example, it may refer to a drop in wireless performance below a certain threshold value. For example, if a wireless device in which the ACF Agent is provided, or with which the ACF Agent is communicatively coupled, streams video to one or more users in a network, such as, for example, with reference to FIG. 1, if Gateway 132 is streaming video or audio content to 6LP Network 142, and Gateway 132 is seen by ACF Agent 130 (provided in or disposed near Gateway 132) to be dropping a significant number of video packets in excess of a defined threshold, this may be due to a spike in wireless interference in the vicinity of Gateway 132, and thus may trigger a new interference scan by ACF Agent 130 at block 301.

From block 301, process 300 may bifurcate into two branches, and may therefore proceed both to block 310, and to block 305 in parallel. As shown in FIG. 3, these branches rejoin at block 320, described below. First considering process flow through block 305, here the ACF Management Agent may update a Wireless Interference Map 307 which it maintains, based on the newly received wireless interference data, as shown in block 301, for the vicinity of, e.g., the free space surrounding, the ACF Agent.

In embodiments, an ACF Management Agent may maintain an interference map for each ACF Agent. Physical location data for each ACF agent may be incorporated, for example based on GPS or other positioning system. Based on the physical location of the ACF Agents (for example, if they are in the same room or premise, or in close physical proximity, such as in the same apartment or dwelling, or neighboring apartments, or, for example, in various vehicles on a roadway) then, in embodiments, the interference maps for each ACF Agent may be combined. For example, in the case of multiple vehicles stuck in traffic in close proximity to each other, the GPS location of each vehicle may be obtained. The interference maps may then correspond to the physical location of each vehicle as specified by GPS coordinates and, in embodiments, may be combined accordingly if, for example, two cars are in close proximity.

Following the update of Wireless Interference Map 307, process flow may move to block 320, described below.

Now considering process flow through the branch beginning with block 310, at block 310 the ACF Agent may periodically collect deployment information and network statistics and send them to the ACF Management Agent. In embodiments, this information may include, for example, the levels of interference, the measured quality of service, retransmissions, packet error rate, etc. that provide an overall metric of network quality. From block 310 process 300 may proceed to block 315, where the ACF Management Agent may update a Deployment Information Database 317 that it maintains, based on the newly received deployment information and network statistics, as shown in block 310. Following the update of Deployment Information Database 317, process flow may move to block 320, next described. It is noted that at block 310, if there was no new deployment information and network statistics at block 310, then process flow may move directly to block 320, along path 311, as shown.

At block 320 the ACF Management Agent may run an inference process, using Inferencing Engine Module 111 of FIG. 1, to obtain an optional wireless connectivity configuration for a wireless device associated with the ACF Agent. As noted above, if several ACF Agents are in close proximity, such as in one premise, or in one apartment building or shared commercial space, such as a mall, for example, then at block 320 an optional wireless connectivity configuration may be generated for all such proximate ACF Agents. The optional wireless connectivity configurations may, or may not, use one combined Wireless Interference Map 307 for several ACF Agents, as discussed above. Thus, for example, if there is too much interference a backup configuration may be used, such as a clear channel that is not being interfered with.

From block 320 process 300 may proceed to block 325, where the ACF Management Agent may convert the results of the inference process of block 320 to a useable set of data, namely target wireless technology configurations and/or rules for the ACF Agent, or plurality of proximate ACF Agents involved in the inference process of block 320. In embodiments, such example rules may include: "if Bluetooth experiences interference due to Wi-Fi on channel X, the Bluetooth will switch to channel Y." Or, for example, "If Wi-Fi experiences interference on channel A due to Bluetooth, it will reduce its data rate and provide some limited throughput instead of none." From block 325 process 300 may proceed to block 327, where the ACF Management Agent may send the wireless connectivity configuration obtained in block 325 to the ACF Agent (or plurality of proximate ACF Agents, as noted above). With the sending of the wireless connectivity configuration, this ends the portion of process 300 that occurs on the ACF Management Agent.

From block 327 process 300 may proceed to query block 330, where, now on the ACF Agent, it may be determined if an update is needed by the ACF Agent. Thus, If the ACF Agent determines that there is new interference map, it may update the wireless configuration to avoid or mitigate this interference. Continuing with reference to FIG. 3, if Yes at query block 330, then process 300 may proceed to block 331, where the ACF Agent may configure a wireless connector or coordinator on a wireless device associated with the ACF Agent.

On the other hand, if No at query block 330, then process flow may continue to query block 335, where it may be determined if there is an adaptive run-time update. Thus, at this point if the interference levels are low enough so as not to cause any issues, the ACF Agent may stop. However, if it appears that the interference levels are changing in either level or frequency and causing network issues, then further mitigation is necessary and another iteration is required. Therefore, if Yes at query block 335, then process 300 may proceed once again to block 301, and once again follow the process flow as described above. If, however, the determination is No at query block 335, then process 300 may proceed to block 337, where the ACF Agent may end the secure session with the ACF Management Agent, and process 300 may end, as shown at block 340.

Figure 4:
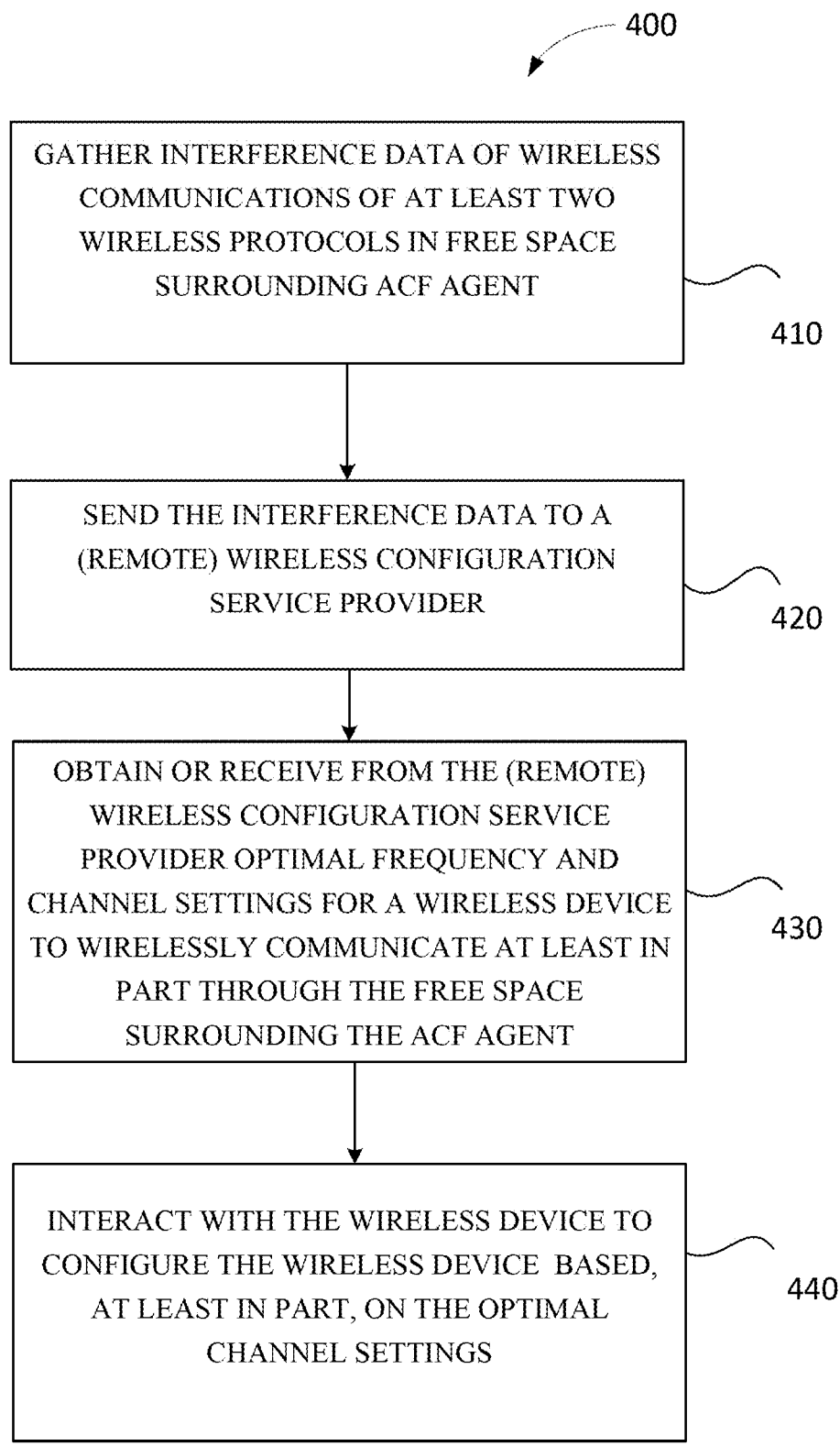
FIG. 4 illustrates an overview of the operational flow of a process to be performed by an adaptive channel and frequency service agent, in accordance with various embodiments.

With reference to FIG. 4, an overview of the operational flow of a process to be performed by an adaptive channel and frequency agent (ACF Agent), in accordance with various embodiments, is presented. As noted above, and as shown in FIG. 1, for example, there may be multiple such ACF Agents disposed in the same space, and thus each of them may perform the process of FIG. 4, and, at times, may perform the process simultaneously. Process 400 may begin at block 410, where the ACF Agent may gather interference data of wireless communications of at least two wireless protocols in free space surrounding an ACF Agent. As noted above, communications for the at least two wireless protocols may be coming from one wireless device, many wireless devices, or, for example, in IoT networks, from multiple nodes acting as a networked virtual "device." For example, this gathering of interference data may be performed by Wireless Interference Scanner 155 of ACF Agent 150 in FIG. 1. From block 410, process 400 may proceed to block 420, where the ACF Agent may send, for example by Communication Session Module 157 of FIG. 1, the interference data to a wireless configuration service provider, such as ACF Management Agent 110 in FIG. 1. The wireless configuration service provider may be remote from the ACF Agent, and provided in the cloud, or alternatively may be relatively in the same geographical area. From block 420, process 400 may proceed to block 430, where the ACF Agent may obtain or receive from wireless configuration service provider, for example, ACF Management Agent 110 in FIG. 1, optimal frequency and channel settings for a wireless device to wirelessly communicate at least in part through the free space surrounding ACF Agent 130 in FIG. 1. Finally, from block 430, process 400 may proceed to block 440, where the ACF Agent may interact with the wireless device to respectively configure the wireless device, based, at least in part, on the optimal channel settings. At block 440, process 400 may end.

Figure 5:
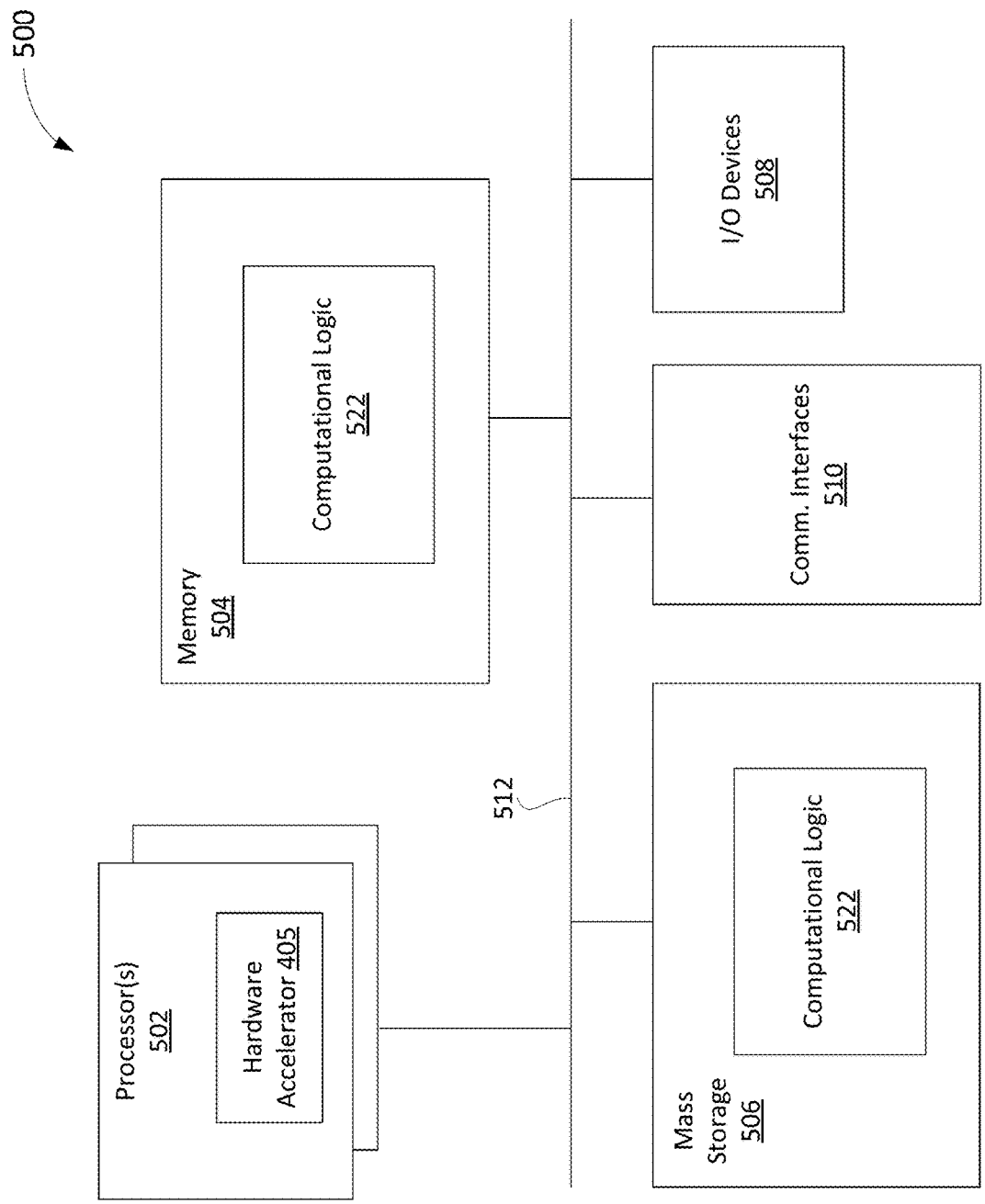
FIG. 5 illustrates a block diagram of a computer device suitable for practicing the present disclosure, in accordance with various embodiments.

Referring now to FIG. 5 wherein a block diagram of a computer device suitable for practicing the present disclosure, in accordance with various embodiments, is illustrated. As shown, computer device 500 may include one or more processors 502, memory controller 503, and system memory 504. Each processor 502 may include one or more processor cores, and hardware accelerator 505. An example of hardware accelerator 505 may include, but is not limited to, programmed field programmable gate arrays (FPGA). In embodiments, processor 502 may also include a memory controller (not shown). In embodiments, system memory 504 may include any known volatile or non-volatile memory.

Additionally, computer device 500 may include mass storage device(s) 506 (such as solid state drives), input/output device interface 508 (to interface with various input/output devices, such as, mouse, cursor control, display device (including touch sensitive screen), and so forth) and communication interfaces 510 (such as network interface cards, modems and so forth). In embodiments, communication interfaces 510 may support wired or wireless communication, including near field communication. The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage device(s) 506 may be employed to store a working copy and a permanent copy of the executable code of the programming instructions of an operating system, one or more applications, and/or various modules of ACF Management Agent 110 or ACF agent 150, depending on the use of computer device 500, collectively referred to as computing logic 522. The programming instructions implementing computing logic 522 may comprise assembler instructions supported by processor(s) 502 or high-level languages, such as, for example, C, that can be compiled into such instructions. In embodiments, some of computing logic may be implemented in hardware accelerator 505. In embodiments, part of computational logic 522, e.g., a portion of the computational logic 522 associated with the runtime environment of the compiler may be implemented in hardware accelerator 505.

The permanent copy of the executable code of the programming instructions or the bit streams for configuring hardware accelerator 505 may be placed into permanent mass storage device(s) 506 and/or hardware accelerator 505 in the factory, or in the field, through, for example, a distribution medium (not shown), such as a compact disc (CD), or through communication interface 510 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 510-512 may vary, depending on the intended use of example computer device 500, e.g., whether example computer device 500 is a smartphone, tablet, ultrabook, a laptop, a server, a set-top box, a game console, a camera, and so forth. The constitutions of these elements 510-512 are otherwise known, and accordingly will not be further described.

Figure 6:
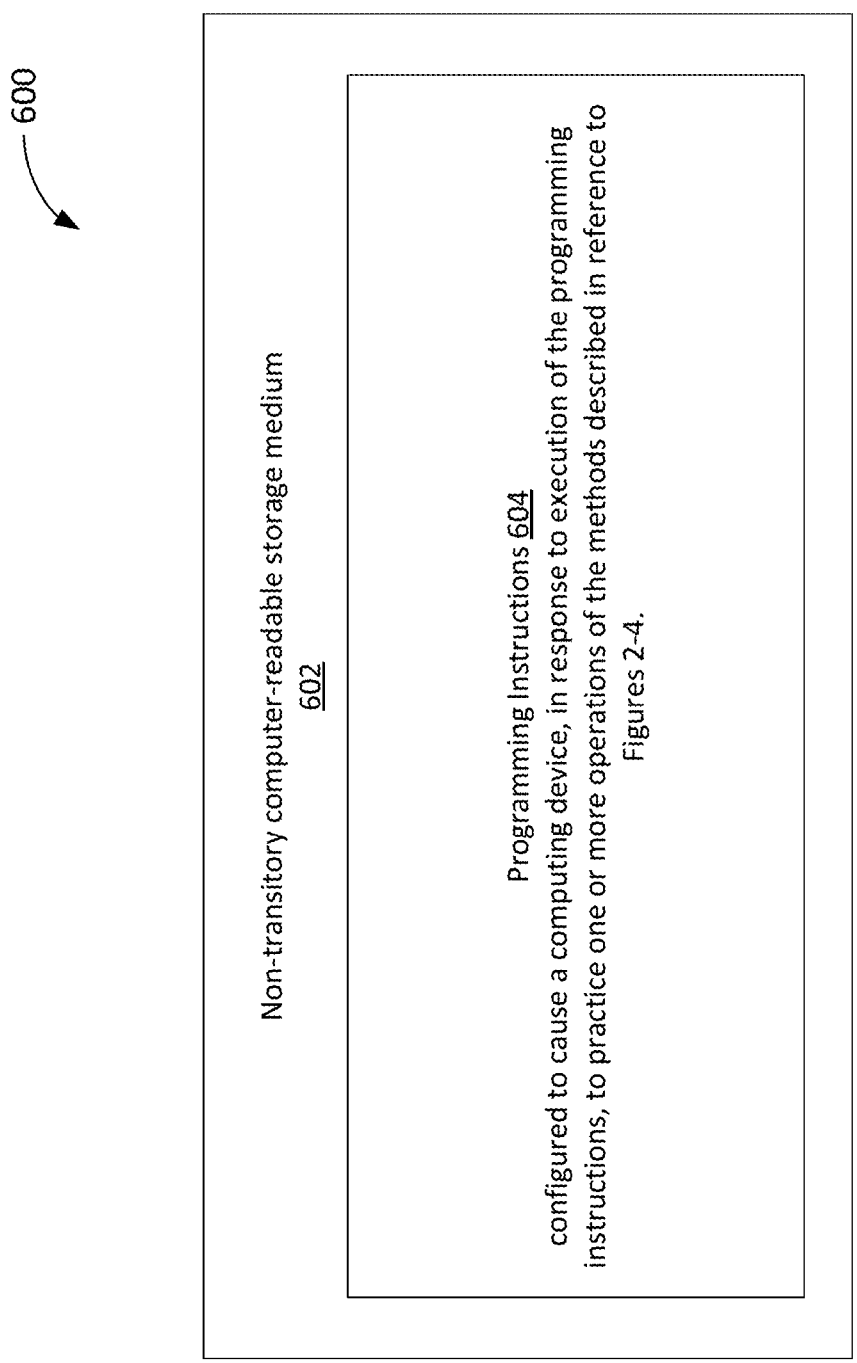
FIG. 6 illustrates an example computer-readable storage medium having instructions configured to practice aspects of the processes of FIGS. 3 and 4, in accordance with various embodiments.

FIG. 6 illustrates an example computer-readable storage medium having instructions configured to implement all (or portion of) communication analyzing module 151, channel and frequency configuration module 153, wireless interference scanner 155, communication session module 157, inferencing engine module 111, channel and frequency management module 113, deployment information module 115, wireless interference map module 117, wireless interference scanner 119 and communication session management module 121, and/or practice (aspects of) processes 200, 300 and 400 of FIGS. 2-4, respectively, earlier described, in accordance with various embodiments. As illustrated, computer-readable storage medium 602 may include the executable code of a number of programming instructions or bit streams 604. Executable code of programming instructions (or bit streams) 604 may be configured to enable a device, e.g., computer device 600, in response to execution of the executable code/programming instructions (or operation of an encoded hardware accelerator 605), to perform (aspects of) processes 200, 300 and 400 of FIGS. 2-4, respectively. In alternate embodiments, executable code/programming instructions/bit streams 604 may be disposed on multiple non-transitory computer-readable storage medium 602 instead. In embodiments, computer-readable storage medium 602 may be non-transitory. In still other embodiments, executable code/programming instructions 604 may be encoded in transitory computer readable medium, such as signals.

Referring back to FIG. 5, for one embodiment, at least one of processors 502 may be packaged together with a computer-readable storage medium having some or all of the compiler or runtime environment of computing logic 522 (in lieu of storing in system memory 504 and/or mass storage device 506) configured to practice all or selected ones of the operations earlier described with reference to FIGS. 2-4. For one embodiment, at least one of processors 502 may be packaged together with a computer-readable storage medium having some or all of the compiler or runtime environment of computing logic 522 to form a System in Package (SiP). For one embodiment, at least one of processors 502 may be integrated on the same die with a computer-readable storage medium having some or all of the compiler or runtime environment of computing logic 522. For one embodiment, at least one of processors 502 may be packaged together with a computer-readable storage medium having some or all of the compiler or runtime environment of computing logic 522 to form a System on Chip (SoC). For at least one embodiment, the SoC may be utilized in, e.g., but not limited to, a hybrid computing tablet/laptop.

FIGS. 7 through 10, next described, illustrate internet-of-things (IoT) networks and an example IoT processing device which may be used in accordance with various embodiments.

Figure 7:
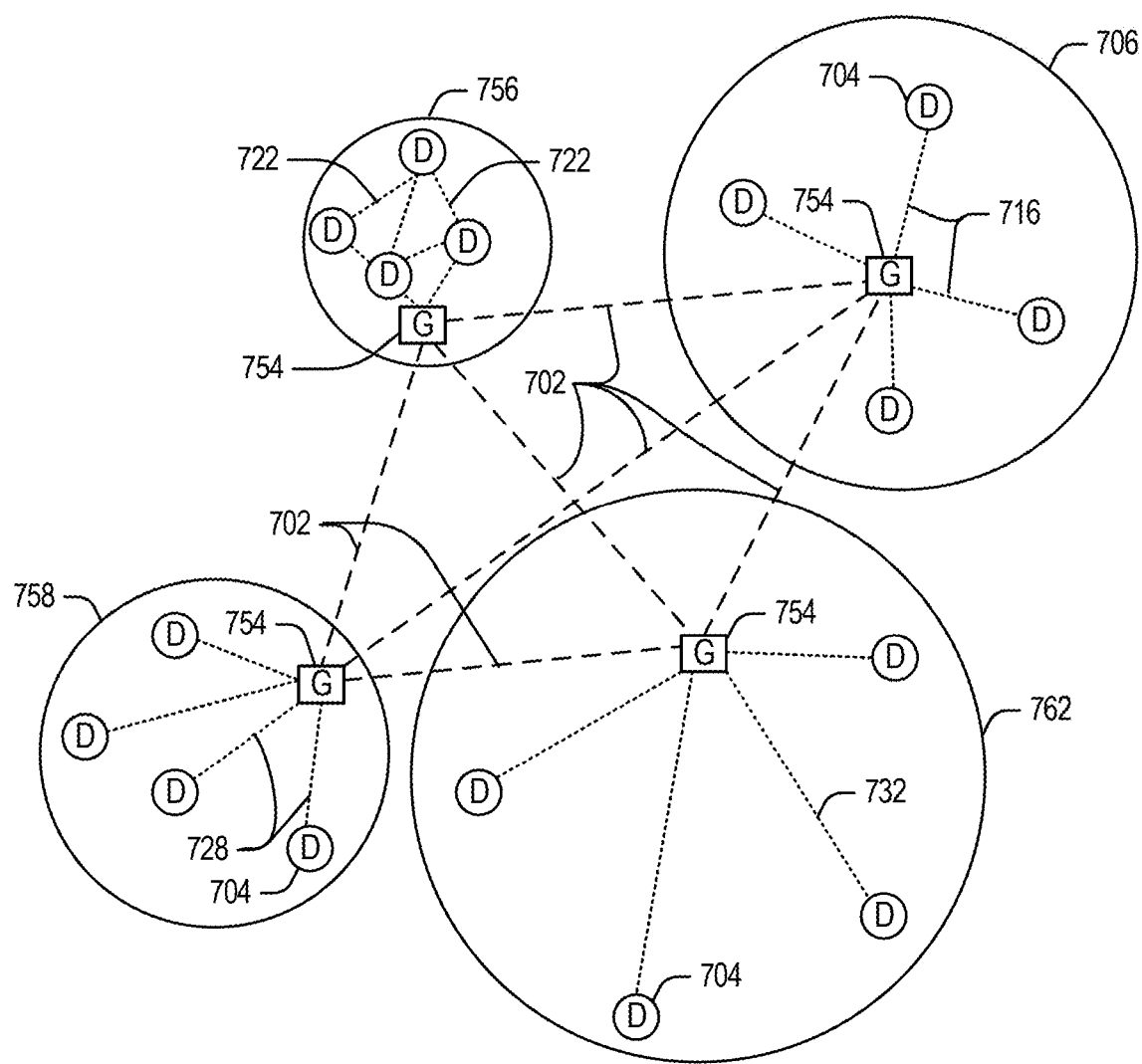
FIG. 7 illustrates a domain topology for respective internet-of-things (IoT) networks coupled through links to respective gateways, in accordance with various embodiments.

FIG. 7 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 8:
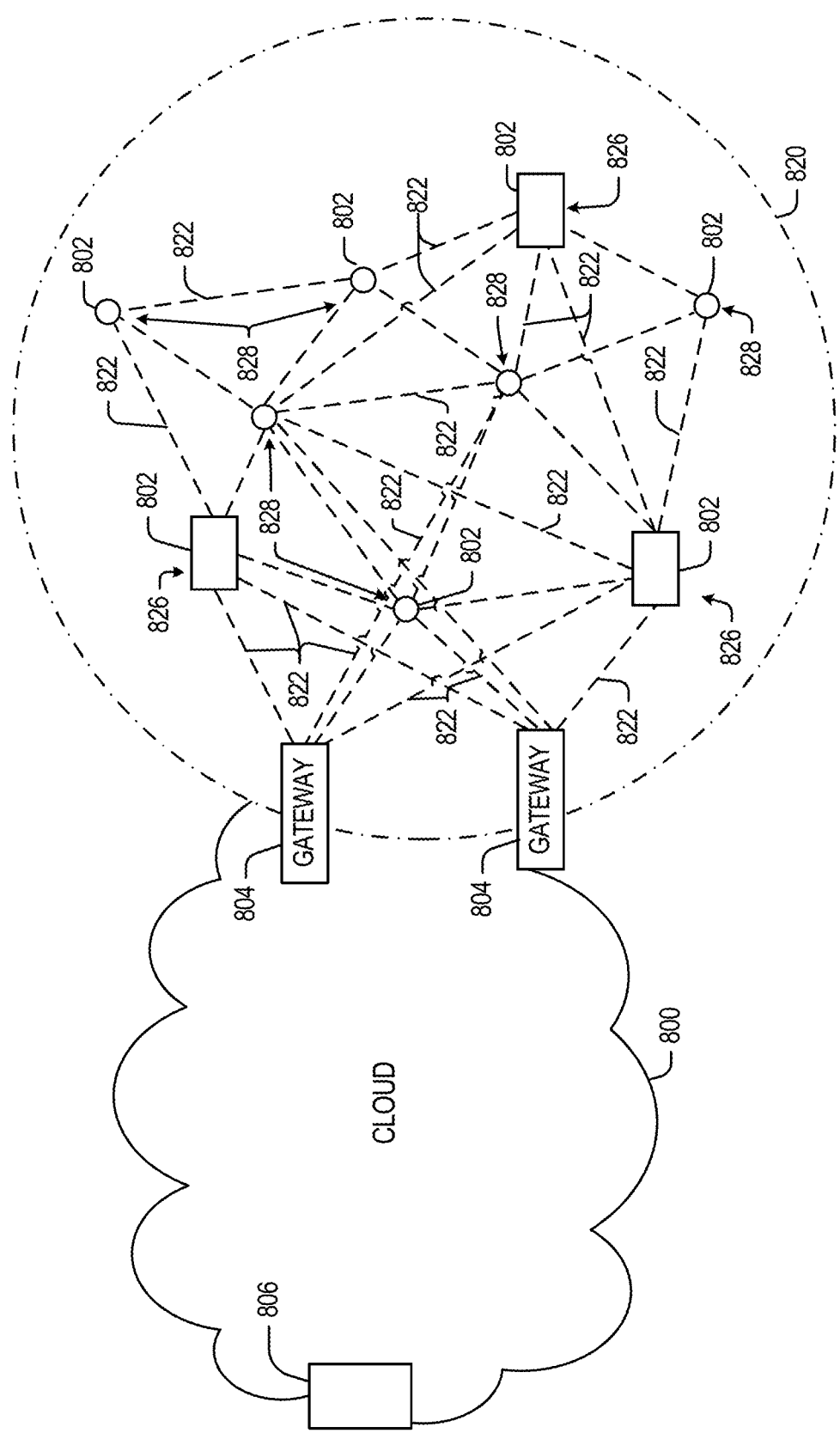
FIG. 8 illustrates a cloud computing network in communication with a mesh network of IoT devices operating as a fog device at the edge of the cloud computing network, in accordance with various embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7 and 8, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies. This is discussed further with respect to the communication environment and hardware of an IoT processing device depicted in FIGS. 9 and 10.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 8 below.

FIG. 8 illustrates a cloud computing network in communication with a mesh network of IoT devices (devices 802) operating as a fog device at the edge of the cloud computing network. The mesh network of IoT devices may be termed a fog 820, operating at the edge of the cloud 800. To simplify the diagram, not every IoT device 802 is labeled.

The fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the fog 820, and may also provide the backend process function for data obtained from sensors 828, such as motion data, flow data, temperature data, and the like. The data aggregators 826 may collect data from any number of the sensors 828, and perform the back end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along a convenient path (e.g., a most convenient path) between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The fog 820 provided from these IoT devices 802 may be presented to devices in the cloud 800, such as a server 806, as a single device located at the edge of the cloud 800, e.g., a fog device. In this example, the alerts coming from the fog device may be sent without being identified as coming from a specific IoT device 802 within the fog 820. In this fashion, the fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the fog device may be configured in a declarative programming style, allowing the IoT devices 802 to reconfigure their operations and communications, such as to determine needed resources in response to conditions, queries, and device failures. As an example, a query from a user located at a server 806 about the operations of a subset of equipment monitored by the IoT devices 802 may result in the fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, IoT devices 802 in the fog 820 may select the sensors 828 used based on the query, such as adding data from flow sensors or temperature sensors. Further, if some of the IoT devices 802 are not operational, other IoT devices 802 in the fog 820 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 9:
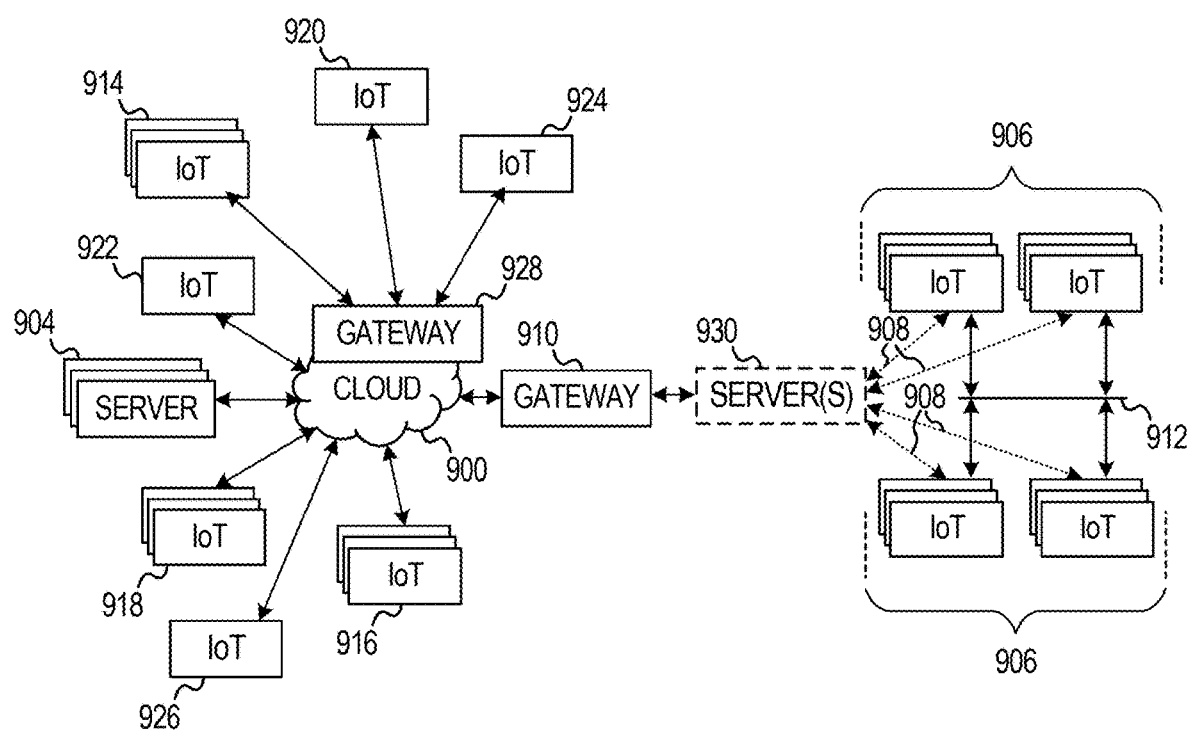
FIG. 9 illustrates a block diagram of a network illustrating communications among a number of IoT devices, in accordance with various embodiments.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown in FIG. 9, but depicted in FIG. 8), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8.

Figure 10:
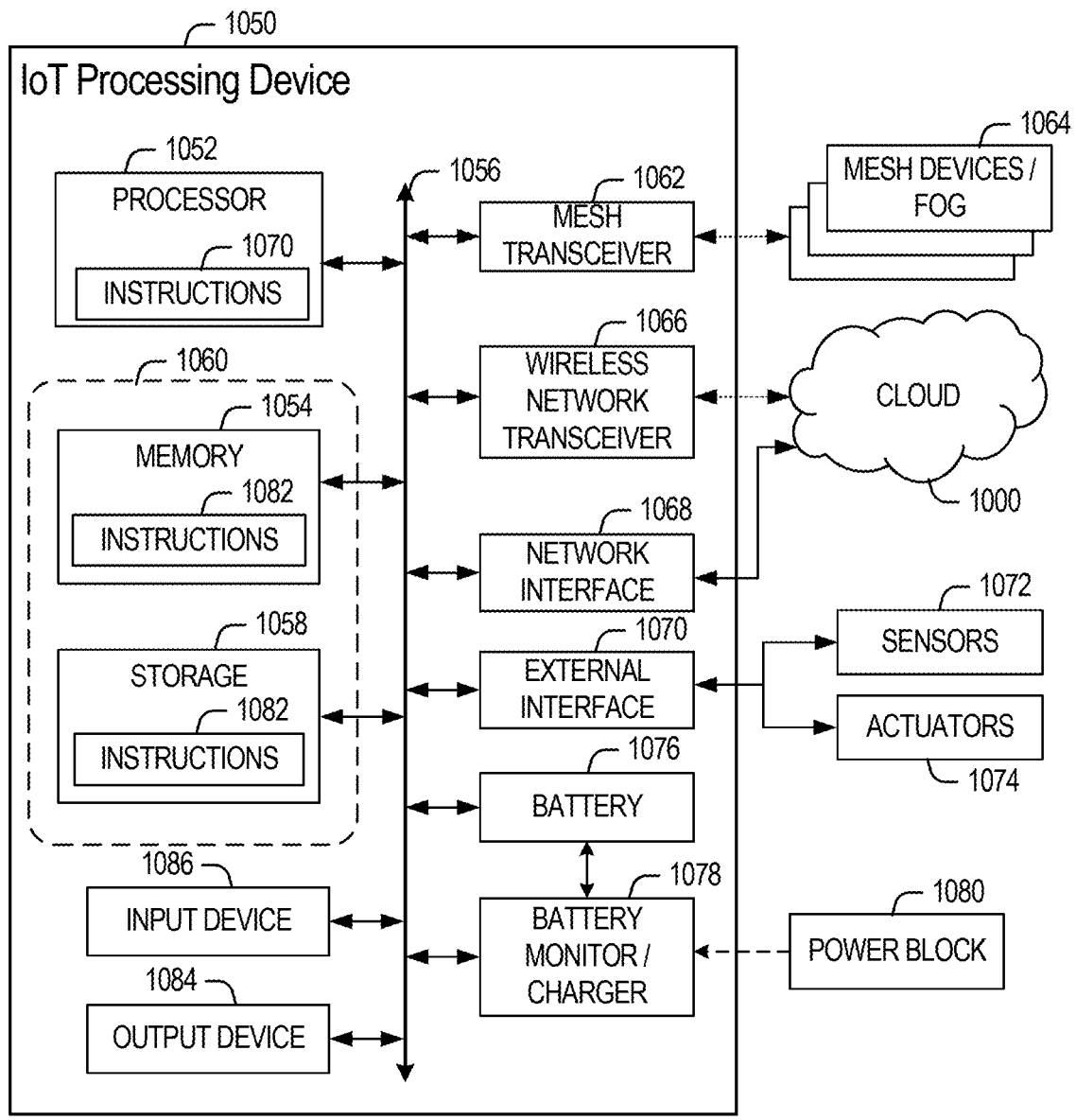
FIG. 10 illustrates a block diagram for an example IoT processing system architecture upon which any one or more of the techniques (e.g., operations, processes, methods, and methodologies) discussed herein may be performed, in accordance with various embodiments.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Cal. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional MC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

Illustrative examples of the technologies disclosed herein are provided below. An embodiment of the technologies may include any one or more, and any combination of, the examples described below.

Example 1 may include an apparatus for providing adaptive wireless communication management, comprising: a wireless interference scanner to gather interference data of wireless communications of at least two wireless protocols in free space surrounding the apparatus; a communications module, coupled to the wireless interference scanner, to interact with a wireless configuration service provider to send the interference data to, and from which to receive optimal channel settings for, a wireless device to wirelessly communicate at least in part through the free space surrounding the apparatus; and a channel and frequency configuration module, coupled to the communications module, to configure the wireless device, based, at least in part, on the optimal channel settings.

Example 2 may include the apparatus of example 1, and/or other examples herein, wherein the interference data are of heterogeneous communications of different wireless protocols.

Example 3 may include the apparatus of either of examples 1 or 2, and/or other examples herein, wherein the different wireless protocols include two or more of WiFi, Bluetooth, LTE, ZigBee or 6LP.

Example 4 may include the apparatus of examples 1 or 2, and/or other examples herein, wherein the channel and frequency configuration module is to provide an initial setup configuration for the wireless device.

Example 5 may include the apparatus of example 4, and/or other examples herein, wherein the communications module is further to receive ongoing periodic updates from the wireless configuration service provider, and the channel and frequency configuration module is further to configure the wireless device on an ongoing basis.

Example 11 may include the apparatus of example 3, and/or other examples herein, wherein the channel and frequency configuration module is further to interact with wireless connectivity management middleware and drivers on the wireless communication device to configure the wireless device.

Example 7 may include the apparatus of example 3, and/or other examples herein, further comprising a communication analysis module, coupled to the communications module, to monitor performance of the wireless device.

Example 8 may include the apparatus of example 7, and/or other examples herein, wherein the communication analysis module is further to perform local performance analysis of the wireless device based on Quality of Service (QoS) metrics derived from statistics collected by connectivity drivers on the wireless device.

Example 9 may include the apparatus of example 8, and/or other examples herein, wherein the channel and frequency configuration module is to further use QoS metrics to prioritize access to channels.

Example 10 may include the apparatus of either of examples 1 or 2, and/or other examples herein, wherein the optimal channel settings are inferred from an interference map generated by the wireless configuration service provider.

Example 11 may include the apparatus of either of examples 1 or 2, and/or other examples herein, wherein the communications module is further to determine if a communications connection is available to a server of the wireless configuration service provider.

Example 12 may include the apparatus of example 11, and/or other examples herein, wherein, in response to a determination that no communications connection is available, the channel and frequency configuration module is to configure channels of the wireless device using default configurations.

Example 13 may include the apparatus of example 12, and/or other examples herein, wherein the default configurations are provided in factory settings.

Example 14 may include the apparatus of example 12, and/or other examples herein, wherein the default configurations were previously received from the wireless configuration service provider, and are based on overall global learning.

Example 15 may include the apparatus of example 11, and/or other examples herein, wherein in response to a determination that a communications connection is available, the wireless interference scanner is to scan wireless interference in the vicinity of the device and send wireless interference data to the server at defined times.

Example 16 may include the apparatus of example 13, and/or other examples herein, wherein the defined times are one of periodic, or at the occurrence of wireless connectivity falling below a pre-defined threshold.

Example 17 may include the apparatus of example 1, and/or other examples herein, wherein the remote wireless configuration service provider is one of collocated with the apparatus or remote.

Example 18 may include the apparatus of example 1, and/or other examples herein, wherein the wireless communication device is one or more of an IoT gateway, an IoT edge node, a WiFi and IEEE 802.15.4 gateway, a Bluetooth and beacon gateway or a WiFi APs gateway.

Example 19 may include a method to be performed by a computer device providing adaptive wireless communication management for a wireless device, comprising: gathering, by the computer device, interference data of wireless communications of at least two wireless protocols in free space surrounding the computer device; sending, by the computer device, the interference data to a remote wireless configuration service provider; obtaining or receiving from the remote wireless configuration service provider, by the computing device, optimal frequency and channel settings for a wireless device to wirelessly communicate at least in part through the free space surrounding the computer device; and interacting, by the computer device, with the wireless device to respectively configure the wireless device, based, at least in part, on the optimal channel settings.

Example 20 may include the method of example 19, and/or other examples herein, wherein configure channels of the wireless device includes mapping channels of the wireless device to frequencies to minimize interference.

Example 21 may include the method of example 19, and/or other examples herein, wherein the optimal channel settings are inferred from an interference map generated and maintained by the remote wireless configuration service provider.

Example 22 may include the method of example 19, and/or other examples herein, wherein the interference data are of heterogeneous communications of different wireless protocols.

Example 23 may include the method of example 19, and/or other examples herein, wherein the different wireless protocols include two or more of WiFi, Bluetooth, LTE, or 6LP.

Example 24 may include the method of example 19, and/or other examples herein, further comprising determining if a communications connection is available to a server of the remote wireless configuration service provider.

Example 25 may include the method of example 24, and/or other examples herein, wherein, in response to a determination that no communications connection is available, further to configure channels of the wireless device using pre-defined default configurations, and wherein, in response to a determination that a communications connection is available, further to periodically collect deployment information and network statistics for the wireless device and send the deployment information and network statistics to the remote wireless configuration service provider.

Example 27 may include the one or more non-transitory computer-readable storage media comprising a plurality of instructions that in response to being executed cause a computing device to perform the method of any one of examples 19-25.

Example 28 may include a computing device to provide optimal wireless channel settings to apparatuses that provide adaptive wireless communication management for a wireless device, comprising: a communications module to send optimal configuration settings to, and receive local wireless interference data from, at least one adaptive wireless communications apparatus, the local wireless interference data including interference data of wireless communications of at least two wireless protocols in free space surrounding each apparatus; a wireless interference map module coupled to the communications module to construct a wireless interference map based on the local wireless interference data received from each apparatus; and an inference engine module coupled to the wireless interference map module and to the communications module to infer optimal configuration settings for a wireless device to wirelessly communicate at least in part through the free space surrounding each apparatus, based, at least in part, on the interference map.

Example 28 may include the computing device of example 27, and/or other examples herein, wherein the communications module is further to provide synchronous and asynchronous session management and tracking services for the at least one adaptive wireless communications apparatus.

Example 29 may include the computing device of example 27, and/or other examples herein, further comprising a channel and frequency management module, coupled to the inference engine module to maintain rules regarding frequency or channel configurations and to provide particular wireless technologies information to the inference engine module to turn inferencing results into the optimal configuration settings.

Example 30 may include the computing device of example 27, and/or other examples herein, further comprising a deployment information module coupled to the communications module and to the inference engine module to gather local deployment information from one or more adaptive wireless communications apparatus, process the information and feed the information to the inference engine module to enhance the inference of optimal wireless configuration settings for each adaptive wireless communications apparatus.

Example 31 may include the computing device of example 30, and/or other examples herein, wherein the local deployment information includes information from at least some wireless devices adjacent to each adaptive wireless communications apparatus.

Example 32 may include the computing device of example 27, and/or other examples herein, wherein the computing device is to provide optimal wireless channel settings to multiple adaptive wireless communications apparatuses.

Example 33 may include one or more non-transitory computer-readable storage media comprising a plurality of instructions that in response to being executed cause a computing device to: obtain, by the computing device, interference data of wireless communications of at least two wireless protocols in free space surrounding the computing device; interact with a remote wireless configuration service provider to send the wireless interference data to, and from which to receive optimal channel settings for, a wireless device to wirelessly communicate at least in part through the free space surrounding the computing device; and configure channels of the wireless device based, at least in part, on the optimal channel settings.

Example 34 may include the one or more non-transitory computer-readable storage media of example 33, and/or other examples herein, wherein the plurality of instructions, in response to being executed further cause the computing device to provide an initial setup configuration for the wireless device.

Example 35 may include the one or more non-transitory computer-readable storage media of example 33, and/or other examples herein, wherein the plurality of instructions, in response to being executed further cause the computing device to receive ongoing periodic updates from the wireless configuration service provider, and configure the wireless device on an ongoing basis.

Example 36 may include the one or more non-transitory computer-readable storage media of example 33, and/or other examples herein, wherein the interference data are of heterogeneous communications of different wireless protocols.

Example 37 may include the one or more non-transitory computer-readable storage media of example 33, and/or other examples herein, wherein the different wireless protocols include two or more of WiFi, Bluetooth, LTE, ZigBee or 6LP.

Example 38 may include the one or more non-transitory computer-readable storage media of example 33, and/or other examples herein, wherein to configure channels of the wireless device includes to interact with wireless connectivity management middleware and drivers on the wireless communication device to configure the wireless device.

Example 39 may include the one or more non-transitory computer-readable storage media of example 33, and/or other examples herein, wherein the plurality of instructions, in response to being executed further cause the computing device to monitor performance of the wireless device.

Example 40 may include the one or more non-transitory computer-readable storage media of example 39, and/or other examples herein, wherein the plurality of instructions, in response to being executed further cause the computing device to perform local performance analysis of the wireless device based on Quality of Service (QoS) metrics derived from statistics collected by connectivity drivers on the wireless device.

Example 41 may include the one or more non-transitory computer-readable storage media of example 33, and/or other examples herein, wherein the plurality of instructions, in response to being executed further cause the computing device to use QoS metrics to prioritize access to channels.

Example 42 may include the one or more non-transitory computer-readable storage media of example 33, and/or other examples herein, wherein the optimal channel settings are inferred from an interference map generated by the wireless configuration service provider.

Example 43 may include the one or more non-transitory computer-readable storage media of example 33, and/or other examples herein, wherein the plurality of instructions, in response to being executed further cause the computing device to determine if a communications connection is available to a server of the wireless configuration service provider.

Example 44 may include the one or more non-transitory computer-readable storage media of example 43, and/or other examples herein, wherein the plurality of instructions, in response to being executed further cause the computing device to, in response to a determination that no communications connection is available, to configure channels of the wireless device using default configurations.

Example 45 may include the one or more non-transitory computer-readable storage media of example 44, and/or other examples herein, wherein the default configurations are at least one of: provided in factory settings of the wireless device, or previously received from the wireless configuration service provider, and are based on overall global learning.

Example 46 may include the one or more non-transitory computer-readable storage media of example 43, and/or other examples herein, wherein the plurality of instructions, in response to being executed further cause the computing device to, in response to a determination that a communications connection is available, scan wireless interference in the vicinity of the device and send wireless interference data to the server at defined times.

Example 47 may include the one or more non-transitory computer-readable storage media of example 46, and/or other examples herein, wherein the defined times are one of periodic, or at the occurrence of wireless connectivity of the wireless device falling below a pre-defined threshold.

Example 48 may include the one or more non-transitory computer-readable storage media of example 43, and/or other examples herein, wherein the remote wireless configuration service provider is one of collocated with the computing device or remote from it.

Example 49 may include the one or more non-transitory computer-readable storage media of example 43, and/or other examples herein, wherein the wireless communication device is one or more of an IoT gateway, an IoT edge node, a WiFi and IEEE 802.15.4 gateway, a Bluetooth and beacon gateway or a WiFi APs gateway.

Example 50 may include an apparatus for computing, comprising: means for gathering interference data of wireless communications of at least two wireless protocols in free space surrounding the apparatus; means for communicating, coupled to the means for gathering, to interact with a wireless configuration service provider to send the interference data to, and from which to receive optimal channel settings for, a wireless device to wirelessly communicate at least in part through the free space surrounding the apparatus; and means for configuring, coupled to the means for communicating, to configure the wireless device, based, at least in part, on the optimal channel settings.

Example 51 may include the apparatus for computing of example 50, and/or other examples herein, wherein the interference data are of heterogeneous communications of different wireless protocols.

Example 52 may include the apparatus for computing of either of either of examples 50 or 51, and/or other examples herein, wherein the different wireless protocols include two or more of WiFi, Bluetooth, LTE, ZigBee or 6LP.

Example 53 may include the apparatus for computing of either of examples 50 or 51, and/or other examples herein, wherein the means for configuring is to provide an initial setup configuration for the wireless device.

Example 54 may include the apparatus for computing of example 53, and/or other examples herein, wherein the means for communicating is further to receive ongoing periodic updates from the wireless configuration service provider, and the means for configuring is further to configure the wireless device on an ongoing periodic basis.

Example 55 may include the apparatus for computing of example 52, and/or other examples herein, wherein means for configuring is further to interact with wireless connectivity management middleware and drivers on the wireless communication device to configure the wireless device.

Example 56 may include the apparatus for computing of example 52, and/or other examples herein, further comprising means for analyzing coupled to the means for communicating, to monitor performance of the wireless device.

Example 57 may include the apparatus for computing of example 56, and/or other examples herein, wherein the means for analyzing is further to perform local performance analysis of the wireless device based on Quality of Service (QoS) metrics derived from statistics collected by connectivity drivers on the wireless device.

Example 58 may include the apparatus for computing of example 57, and/or other examples herein, wherein the means for configuring is further to use QoS metrics to prioritize access to channels.

Example 59 may include the apparatus for computing of either of examples 50 or 51, and/or other examples herein, wherein the optimal channel settings are inferred from an interference map generated by the wireless configuration service provider.

Example 60 may include the apparatus for computing of either of examples 50 or 51, and/or other examples herein, wherein the means for communicating is further to determine if a communications connection is available to a server of the wireless configuration service provider.

Example 61 may include the apparatus for computing of example 60, and/or other examples herein, wherein, in response to a determination that no communications connection is available, the means for configuring is to configure channels of the wireless device using default configurations.

Example 62 may include the apparatus for computing of example 61, and/or other examples herein, wherein the default configurations are provided in factory settings.

Example 63 may include the apparatus for computing of example 61, and/or other examples herein, wherein the default configurations were previously received from the wireless configuration service provider, and are based on overall global learning.

Example 64 may include the apparatus for computing of example 60, and/or other examples herein, wherein in response to a determination that a communications connection is available, the means for gathering is further to gather wireless interference data in the vicinity of the device and the means for communicating is further to send the wireless interference data to the server at defined times.

Example 65 may include the apparatus for computing of example 62, and/or other examples herein, wherein the defined times are one of periodic, or at the occurrence of wireless connectivity falling below a pre-defined threshold.

Example 66 may include the apparatus for computing of example 50, and/or other examples herein, wherein the remote wireless configuration service provider is one of collocated with the apparatus for computing or remote.

Example 67 may include the apparatus for computing of example 50, and/or other examples herein, wherein the wireless communication device is one or more of an IoT gateway, an IoT edge node, a WiFi and IEEE 802.15.4 gateway, a Bluetooth and beacon gateway or a WiFi APs gateway.

What is claimed is:
1. An apparatus for providing adaptive wireless communication management, comprising:
    a wireless interference scanner to gather first interference data of wireless communications in a first wireless protocol by a first wireless gateway device having the apparatus, and wireless communications in a second wireless protocol, different from the first wireless protocol, by a second wireless gateway device proximally located with the first wireless gateway device;

a communications module, coupled to the wireless interference scanner, to interact with a cloud wireless configuration service provider external to and remotely disposed from the first and second wireless gateway devices, to send the first interference data to, and from which to receive channel settings for, the first wireless gateway device to wirelessly communicate, the cloud wireless configuration service provider further receiving second interference data of wireless communications from the second wireless gateway device, and determining the channel settings based at least in part on the first and the second interference data; and a channel and frequency configuration module, coupled to the communications module, to configure the first wireless gateway device, based, at least in part, on the channel settings received.

2. The apparatus of claim 1, wherein the first wireless protocol is a selected one of WiFi, Bluetooth, LTE, ZigBee or 6LP, and the second wireless protocol is a different selected one of WiFi, Bluetooth, LTE, ZigBee or 6LP.

3. The apparatus of claim 1, wherein the channel and frequency configuration module is to provide an initial setup configuration for the first wireless gateway device.

4. The apparatus of claim 3, wherein the communications module is further to receive ongoing periodic updates from the cloud wireless configuration service provider and the channel and frequency configuration module is further to configure the first wireless gateway device on an ongoing periodic basis.

5. The apparatus of claim 1, wherein the channel and frequency configuration module is further to interact with wireless connectivity management middleware and drivers on the first wireless gateway device to configure the first wireless gateway device.

6. The apparatus of claim 1, further comprising a communication analysis module, coupled to the communications module, to monitor communication performance of the first wireless gateway device.

7. The apparatus of claim 6, wherein the communication analysis module is further to perform performance analysis of the first wireless gateway device based on Quality of Service (QoS) metrics derived from statistics collected by connectivity drivers on the first wireless gateway device.

8. The apparatus of claim 1, wherein the channel settings are inferred from an interference map generated by the cloud wireless configuration service provider.

9. The apparatus of claim 1, wherein the communications module is further to determine whether a communications connection is available to a server of the cloud wireless configuration service provider.

10. The apparatus of claim 9, wherein, in response to a determination that no communications connection to a server of the cloud wireless configuration service provider is available, the channel and frequency configuration module is to configure channels of the first wireless gateway device using default configurations, and wherein in response to a determination that a communications connection to a server of the cloud wireless configuration service provider is available, the wireless interference scanner is to scan wireless interference in the vicinity of the first wireless gateway device and send wireless interference data to the server at defined times.

11. The apparatus of claim 10, wherein the defined times are one of periodic, or at the occurrence of wireless connectivity falling below a pre-defined threshold.

12. The apparatus of claim 1, wherein the first wireless gateway device is one or more of an Internet-of-Thing (IoT) gateway, an IoT edge node, a WiFi and Institute of Electrical and Electronic Engineers (IEEE) 802.15.4 gateway, a Bluetooth and beacon gateway or a WiFi Access Point (AP) gateway.

13. A method for providing adaptive wireless communication management to a first wireless gateway device, comprising:

gathering, by a first component of the first wireless gateway device, interference data of wireless communications of at least two different wireless protocols in free space by the first wireless gateway device and at least a second wireless gateway device located proximally with the first wireless gateway device;

sending, by the first component of the first wireless gateway device, the interference data to a cloud wireless configuration service provider external to and remotely disposed from the first wireless gateway device;

obtaining or receiving from the cloud wireless configuration service provider, by a second component of the first wireless gateway device, frequency and channel settings for the first wireless gateway device to wirelessly communicate at least in part through the free space; and configuring, by a third component of the first wireless gateway device, the first wireless gateway device, based, at least in part, on the channel settings.

14. The method of claim 13, wherein configuring comprises configuring channels of the first wireless gateway device, mapping channels of the first wireless gateway device to one or more frequencies of a plurality of frequencies that provide lower interference among the plurality of frequencies.

15. The method of claim 13, wherein obtaining or receiving comprises obtaining or receiving channel settings that are inferred from an interference map generated and maintained by the cloud wireless configuration service provider.

16. The method of claim 13, further comprising determining whether a communications connection is available to a server of the cloud wireless configuration service provider.

17. The method of claim 16, wherein, in response to a determination that no communications connection to a server of the cloud wireless configuration service provider is available, further to configure channels of the first wireless gateway device using pre-defined default configurations, and wherein, in response to a determination that a communications connection to a server of the cloud wireless configuration service provider is available, further to periodically collect deployment information and network statistics for the first wireless gateway device and send the deployment information and network statistics to the cloud wireless configuration service provider.

18. A computing device to provide wireless channel settings to an apparatus that provides adaptive wireless communication management for a first wireless gateway device hosting the apparatus, comprising:

a communications module to send configuration settings to, and receive local wireless interference data from, the apparatus, the local wireless interference data including interference data of wireless communications of at least two different wireless protocols in free space surrounding the first wireless gateway device and a second wireless gateway device located proximally with the first wireless gateway device;

a wireless interference map module coupled to the communications module to construct a wireless interference map based on the local wireless interference data received from the apparatus; and an inference engine module coupled to the wireless interference map module and to the communications module to infer configuration settings for the first wireless gateway device to wirelessly communicate at least in part through the free space surrounding the first and second wireless gateway devices, based, at least in part, on the wireless interference map.

19. The computing device of claim 18, further comprising a deployment information module coupled to the communications module and to the inference engine module to gather local deployment information from the apparatus, process the information and feed the information to the inference engine module to enhance the inference of wireless configuration settings for the apparatus.

20. The computing device of claim 19, wherein the local deployment information includes information from at least the second wireless gateway device proximally located with the first wireless gateway device.

21. One or more non-transitory computer-readable storage media comprising a plurality of instructions that in response to being executed by a processor of a first wireless gateway device, cause the first wireless gateway device to operate an adaptive wireless communication management service, to:

obtain interference data of wireless communications of at least two different wireless protocols in free space surrounding the first wireless gateway device and a second wireless gateway device located proximally with the first wireless gateway device;

interact with a cloud wireless configuration service provider external to and remote from the first wireless gateway device to send the wireless interference data to, and from which to receive channel settings for, the first wireless gateway device to wirelessly communicate at least in part through the free space surrounding the first and second wireless gateway devices; and configure channels of the first wireless gateway device based, at least in part, on the channel settings.

22. The one or more non-transitory computer-readable storage media of claim 21, wherein the plurality of instructions, in response to being executed further cause the first wireless gateway device to operate the adaptive wireless communication management service to provide an initial setup configuration for the first wireless gateway device.

23. The one or more non-transitory computer-readable storage media of claim 21, wherein the plurality of instructions, in response to being executed, further cause the first wireless gateway device to operate an adaptive wireless communication management service to receive ongoing periodic updates from the cloud wireless configuration service provider, and configure the first wireless gateway device on an ongoing basis.

* * * * *